B. G. VAUGHAN.
MATCH MAKING MACHINE.
APPLICATION FILED DEC. 9, 1910.
1,010,827.
Patented Dec. 5, 1911.
2 SHEETS—SHEET 1.
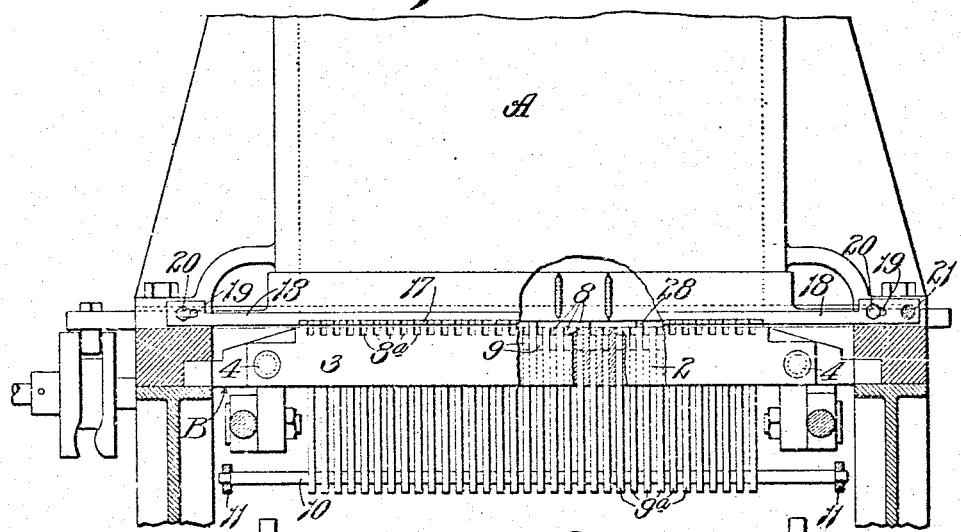
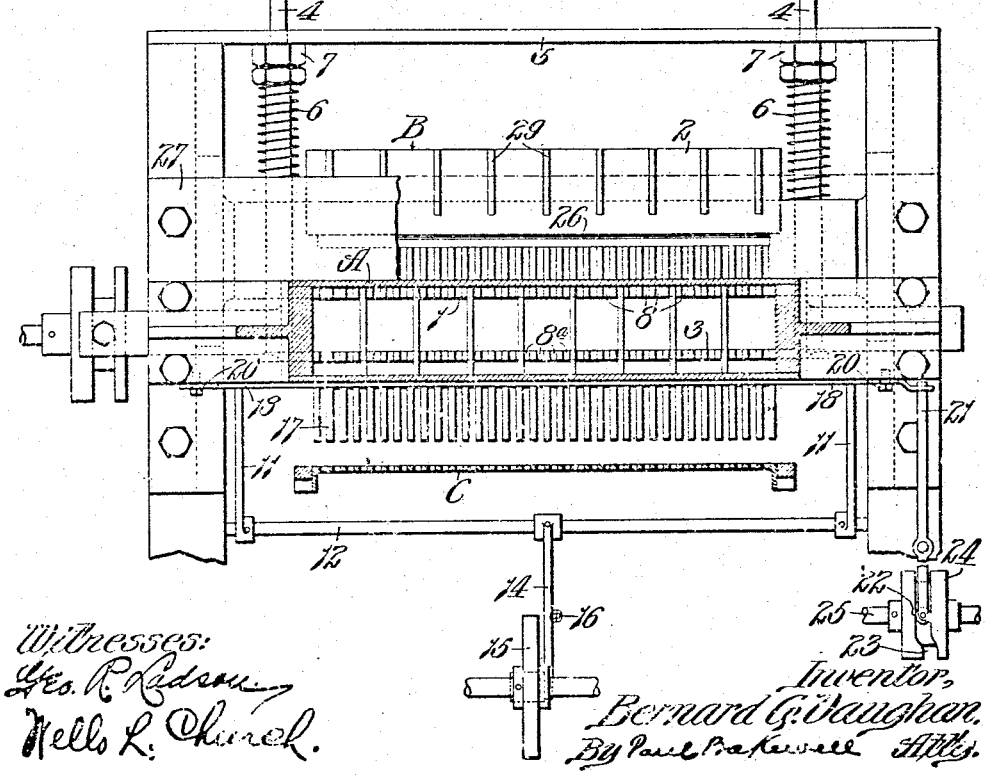

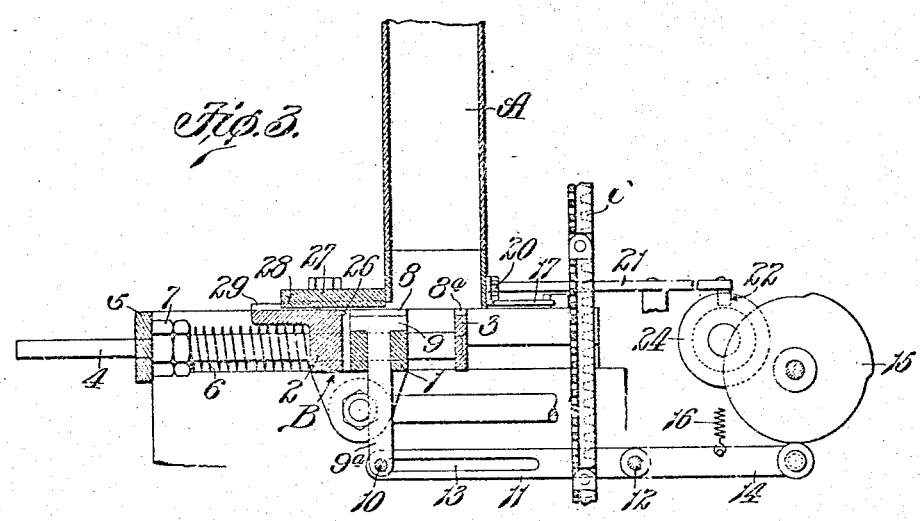

UNITED STATES PATENT OFFICE.

BERNARD G. VAUGHAN, OF JOLIET, ILLINOIS, ASSIGNOR TO NATIONAL MATCH COMPANY, OF JOLIET, ILLINOIS, A CORPORATION OF ILLINOIS.

MATCH-MAKING MACHINE.

1,010,827.   Specification of Letters Patent.   Patented Dec. 5, 1911.

Application filed December 9, 1910. Serial No. 596,489.

*To all whom it may concern:*

Be it known that I, BERNARD G. VAUGHAN, a citizen of the United States, residing at Joliet, Illinois, have invented a certain new and useful Improvement in Match-Making Machines, of which the following is a full, clear, and exact description, such as will enable others skilled in the art to which it appertains to make and use the same.

This invention relates to match-making machines, and particularly to machines of the type in which a grooved "setting head" is employed for inserting the match-splints in the carrier which conveys the splints to the dipping tank.

A comb is sometimes used in machines of the type referred to for cleaning out the grooves in the setting head or dislodging the splints that have become stuck in the grooves, and while the comb is efficient enough to produce a practicable commercial machine, it wears out the grooves in the setting head on account of the friction, and it sometimes fails to dislodge at the first operation, the splints which have become wedged tightly in the grooves.

One object of my invention is to provide a match-making machine which is so designed that the head is not subjected to excessive wear.

Another object is to provide a match-making machine which is so designed that any splints which stick in the grooves will be positively ejected or forced out of the grooves before the setting head reaches its receiving position.

Another object is to provide a match-making machine which is so designed that the match-splints cannot buckle or spring upwardly away from the setting head during the operation of inserting the splints in the carrier. And still another object is to provide means of novel construction for guiding the setting head.

Other objects and desirable features of my invention will be hereinafter pointed out.

Figure 1 of the drawings is a front elevational view of a portion of a match-making machine constructed in accordance with my invention; Fig. 2 is a top plan view of same; Fig. 3 is a vertical sectional view taken through the hopper, setting head and carrier of the machine, showing the setting head in receiving position; and Fig. 4 is a similar view showing the setting head in delivering position.

Referring to the drawings which illustrate the preferred form of my invention, A designates the vertically disposed hopper of the machine into which the match-splints are introduced, B designates the horizontally disposed setting head that reciprocates back and forth under the hopper, and C designates the carrier into which the match-splints are inserted by the setting head B, the carrier of the machine herein shown being composed of a number of perforated plates that travel vertically in front of the setting head. The setting head is composed of two portions 1 and 2 which I will designate, respectively, as the front portion and rear portion of the head, and also a movable member 3 arranged in front of the portion 1 and provided with guide rods 4 that project rearwardly through openings in the portions 1 and 2 of the head, and also through openings in a stationary abutment 5, coiled expansion springs 6 being arranged on said guide rods between the rear part 2 of the head and stops 7 on said guide rods so as to hold the movable member 3 in engagement with the front part 1 of the head during a certain period in the cycle of operations of the machine. Grooves 8 are formed in the top face of the front portion 1 of the head for receiving the match-splints, the depth of said grooves being approximately equal to the cross section of a match-splint so that the splints which lie in said grooves will not project above the top face of the setting head when said head moves forwardly toward the carrier C. The upper edge of the movable member 3 is also provided with grooves 8ª which aline with the grooves 8 in the head as said member 3 coöperates with the front part 1 of the head to receive and support the match-splints.

To insure a thorough cleaning out of the grooves in the setting head at each cycle of operation of the machine, I have provided the front portion 1 of the setting head with ejecting devices 9 whose upper ends or top faces form the bottoms of the grooves 8 in the setting head. Each of said ejecting devices has a shank or leg 9ª that projects downwardly through an opening in the part 1 of the setting head, and all of said ejecting devices are connected together by means of a cross rod or bar 10 which passes transversely through the shanks 9ª of said devices, as shown in Figs. 1, 3 and 4. When the setting head is in receiving position, the ejecting devices 9 will occupy the position shown in Fig. 3, but after the setting head has moved forwardly and inserted the match-splints in the carrier C, said ejecting devices are forced upwardly, as shown in Fig. 4, so as to positively discharge or remove any match-splints that have become wedged or stuck in the grooves 8 of the head. The means herein shown for actuating said ejecting devices consist of a pair of arms 11 connected to a horizontally arranged rock shaft 12 and provided with elongated slots 13 into which the cross rod or bar 10 projects, a short arm 14 projecting forwardly from the rock shaft 12, a cam 15 that coöperates with said arm to move the ejecting devices upwardly, and a spring 16 connected to the arm 14 and to a stationary part of the machine for moving the rock shaft 12 in the opposite direction so as to retract the ejecting devices or restore them to normal position.

A horizontally disposed comb 17 is arranged between the hopper A and the carrier C so as to prevent the match-splints from buckling or springing upwardly during the operation of inserting the splints in the carrier. Said comb is mounted on stationary portions of the machine, and it normally occupies such a position that its teeth aline with the match-splint grooves in the setting head. At a certain period in the cycle of operations of the machine, however, namely, just after the match-splints have been inserted in the carrier C, said comb is moved transversely so as to carry the teeth of same out of alinement with the match-splint grooves in the setting head and thus not interfere with the upward movement of any match-splints which the ejecting devices 9 force out of the setting head. In the embodiment of my invention herein shown the comb 17 is provided at its ends with laterally projecting arms 18 having elongated slots 19 which receive guide pins or bolts 20 connected to stationary parts of the frame of the machine, as shown in Figs. 1 and 2, and one of said arms 18 is connected to a lever 21 that is provided at its front end with a roll 22 which travels in a cam groove 23 formed in a cam block 24 that is connected to a rotating shaft 25. The setting head of the machine herein shown is also provided with a horizontally arranged tooth 26 located at the rear ends of the grooves 8 so as to bite into the rear ends of the match-splints and thus prevent the rear ends of the splints from tilting upwardly during the operation of inserting the splints in the carrier. A stationary guide plate 27, which extends transversely above the setting head at the rear side of the hopper, is provided on its under side with grooves 28, and the rear portion 2 of the setting head is provided on its top face with ribs 29 that travel in said grooves when the setting head moves rearwardly so as to guide the setting head accurately. The main function of these ribs 29 is to guide the setting head accurately and hold it in position, but they also perform another function, namely, they tend to arrange the match-splints in parallel relation to each other when said match-splints first drop onto the setting head.

Having described the construction of my improved machine, I will now describe the operation of same. The match-splints in the hopper A drop onto the top face of the rear portion 2 of the setting head when the setting head moves forwardly or into delivering position, as shown in Fig. 4, the ribs 29 on the top face of the rear portion 2 of the head operating to hold the match-splints in parallel relation to each other. When the setting head moves rearwardly or into receiving position, said splints pass into the grooves 8 and 8ª in the front part 1 of the setting head and in the movable member 3, the short splints, slivers and dust that is mixed with the splints dropping downwardly through the openings formed between the member 3, and the front part of the setting head and between said member 3 and the front wall of the hopper. Upon the return movement or forward movement of the head, the tooth 26 bites into the rear ends of the match-splints and thus securely holds said splints in position, the comb 17 being so arranged at this period in the cycle of operations of the machine that the splints cannot spring upwardly or buckle when they are forced into the carrier C. After the splints have been inserted in the carrier, the lever 21 is actuated so as to move the comb laterally and thus carry the teeth of same out of alinement with the splint-receiving grooves in the setting head. Thereafter, the cam 15 strikes the arm 14 of the rock shaft 12 and moves the ejecting devices 9 upwardly so as to positively discharge any match-splints which stick in the grooves of the setting head, the front wall of the hopper, which bears against the rear ends of the ejected match-splints, preventing said splints from moving rearwardly with the setting head. When the setting head passes from under the ejected match-splints, said splints fall downwardly out of the path of movement of the setting head, and before the setting head reaches its receiving position, shown in Fig. 3, the ejecting devices are retracted or moved downwardly so that the upper ends of same will form the bottoms of the splint-receiving grooves in the head.

Having thus described my invention, what

I claim as new and desire to secure by Letters Patent is:

1. In a match-making machine, a movable setting head provided with ejecting devices which are so arranged that the match-splints on the setting head lie above said ejecting devices and at approximately right angles to the direction in which said devices move.

2. In a match-making machine, a setting head which is adapted to move toward a splint-carrier to insert match-splints thereon, said head being provided with ejecting devices which are so arranged that the match-splints on the setting head lie above said ejecting devices at an angle to the direction in which said devices move, and means for actuating said ejecting devices so as to discharge any splints that remain lodged on the head after the inserting or setting operation has been completed.

3. A reciprocating setting head for match-making machines provided with ejecting devices which move in a direction at approximately right angles to the direction in which said head travels, and means for positioning match-splints above said devices.

4. A match-making machine comprising a reciprocating setting head provided with ejecting devices, means for holding match-splints in a horizontal position above said devices, and means for moving said devices at an angle to the line of movement of the head, so as to discharge the splints that have become lodged in the head.

5. A movable splint setting head for match-making machines provided with horizontally disposed match-splint-receiving grooves, and ejecting devices which form the horizontal bottoms of said grooves.

6. In a match-making machine, a reciprocating setting head provided with horizontally disposed match-splint-receiving grooves whose upper sides are open, ejecting devices carried by said head and arranged longitudinally of said grooves, and means for moving said ejecting devices upwardly through said grooves so as to dislodge and discharge any splints that have become stuck in the grooves.

7. In a match-making machine, a setting head provided with ejecting devices, means for holding match-splints in an approximately horizontal position above said devices, and an actuating mechanism that moves all of the ejecting devices on the head simultaneously in a direction at an angle to the line of movement of the head.

8. In a match-making machine, a movable splint-inserting head provided with horizontally disposed match-splint-receiving grooves, ejecting devices on said head arranged horizontally of said grooves and adapted to pass upwardly or into said grooves, shanks depending from said ejecting devices, a member that connects the shanks of all of said devices together, and an actuating mechanism coöperating with said member.

9. In a match-making machine, a setting head provided with match-splint-receiving grooves, ejecting devices on said head which move at an angle to the line of movement of the head and pass upwardly or into said grooves, shanks depending from said ejecting devices, a member that connects the shanks of all of said devices together, and intermittently operated elements for actuating said member provided with elongated slots through which said member travels during the movements of the setting head.

10. In a match-making machine, a setting head provided with horizontally disposed match-splint-receiving grooves, ejecting devices on said head whose top faces form the bottoms of said grooves, shanks depending from said devices, a rod that passes through all of the shanks and connects them together, a rock shaft provided with arms having elongated slots into which said rod projects, said rock arms being arranged approximately parallel to the line of travel of the setting head, and means for rocking said shaft intermittently so as to actuate said ejecting devices.

11. In a match-making machine, a setting head that is adapted to hold match-splints, a carrier for receiving the splints from said head, a member arranged above said setting head and adjacent the carrier so as to prevent the match-splints from buckling or springing upwardly during the operation of inserting them in the carrier, means for moving said member into an inoperative position after the inserting operation, and match-splint-ejecting devices on said head which move at approximately right angles to the direction in which the head travels.

12. In a match-making machine, a setting head provided with means for holding match-splints in parallel relation to each other, a carrier for receiving the splints from said head, a toothed member arranged above said setting head and in such a manner that the teeth thereof aline with the splints on the setting head during the operation of inserting the splints in the carrier, means for discharging any splints upwardly that remain lodged on the carrier after the setting operation, and means for moving said toothed member into such a position that it does not interfere with the upward movement of the splints that are discharged from said head.

13. In a match-making machine, a setting head provided with means for holding match-splints in parallel relation to each other, a carrier that receives the splints from said head, a member that prevents the match-splints from buckling or springing upwardly during the operation of inserting them in the carrier, means for moving upwardly any splints that remain lodged on the setting head after the setting or inserting operation has been completed, and means for moving said member into such a position that it does not interfere with the upward movement of the splints that are ejected from the head.

14. In a match-making machine, a setting head provided with match-splint-receiving grooves, a carrier for receiving the splints from said setting head, a horizontally disposed comb arranged above the carrier and in such a position that the teeth of same normally aline with the grooves in the setting head so as to prevent the match-splints from springing upwardly or buckling during the operation of inserting them in the carrier, means for shifting said comb transversely so as to move the teeth thereon out of alinement with the grooves in the setting head, and means for dislodging splints that stick in the grooves.

15. In a match-making machine, a reciprocating setting head provided with horizontally disposed match-splint-receiving grooves, a carrier for receiving the splints from said setting head, a horizontally disposed comb arranged above the carrier and in such a position that the teeth of same normally aline with the grooves in the setting head so as to prevent the match-splints from springing upwardly or buckling during the operation of inserting them in the carrier, means for shifting said comb transversely so as to move the teeth thereon out of alinement with the grooves in the setting head, ejecting devices arranged in the grooves of said head, and means for moving said ejecting devices upwardly at an angle to the line of movement of the head after said comb has been shifted so as to positively discharge any splints that have become stuck in the grooves in the head.

16. In a match-making machine, a setting head provided with means for holding match-splints in parallel relation to each other, a carrier for receiving the splints from said head, a horizontally disposed comb arranged above said carrier and extending transversely thereof, means for intermittently reciprocating said comb transversely of the setting head, and ejecting devices on said head which are adapted to move upwardly at approximately right angles to the line of movement of the head.

17. A setting head for match-making machines, comprising a movable member arranged in front of the head proper and operating to support the front ends of the match-splints, means for positioning the match-splints on said head and member and holding them in parallel relation to each other, and ejecting devices on said head arranged under the match-splints carried by the head.

18. A setting head for match-making machines, comprising a reciprocating part provided with match-splint-receiving grooves, a movable member arranged in front of said part and provided with coöperating grooves, means for causing said movable member to be held spaced away from said reciprocating part during a portion of the cycle of operations of the machine, and ejecting devices arranged in the grooves in said reciprocating part.

19. A setting head for match-making machines, comprising a reciprocating part provided with match-splint-receiving grooves, a movable member arranged in front of said part and provided with coöperating grooves, means for causing said movable member to be held spaced away from said reciprocating part during a portion of the cycle of operations of the machine, ejecting devices arranged in the grooves in said reciprocating part, and means on said setting head that bites into the rear ends of the match-splints and thus prevents the rear ends of said splints from tilting upwardly during the operation of inserting the splints in the carrier with which the head coöperates.

20. In a match-making machine, a hopper, a setting head that reciprocates back and forth under said hopper, a guide plate arranged above said setting head and provided on its under side with grooves, and ribs on the top face of said setting head which travel in said grooves and also operate to straighten the match-splints when said splints first drop onto the setting head.

21. In a match-making machine, a setting head provided with means for holding match-splints in parallel relation to each other, a carrier for receiving the splints from said head, means on said head that bites into the rear ends of the match-splints so as to prevent them from tilting upwardly, and a member that prevents the splints from buckling during the operation of inserting them in the carrier.

In testimony whereof I hereunto affix my signature in the presence of two witnesses, this 29 day of November 1910.

BERNARD G. VAUGHAN.

Witnesses:
LOUIS A. SHERWOOD,
HENRY LESER.